US010235900B2

(12) United States Patent
Aiken

(10) Patent No.: US 10,235,900 B2
(45) Date of Patent: Mar. 19, 2019

(54) CONSUMER ELECTRONICS REPAIR GUIDE CARD WITH MAGNETIC HOLDER

(71) Applicant: Phillip Karlton Aiken, Columbia, SC (US)

(72) Inventor: Phillip Karlton Aiken, Columbia, SC (US)

( * ) Notice: Subject to any disclaimer, the term of this patent is extended or adjusted under 35 U.S.C. 154(b) by 54 days.

(21) Appl. No.: 15/390,735

(22) Filed: Dec. 27, 2016

(65) Prior Publication Data

US 2017/0193850 A1 Jul. 6, 2017

Related U.S. Application Data

(60) Provisional application No. 62/273,488, filed on Dec. 31, 2015.

(51) Int. Cl.
G09B 19/00 (2006.01)
B25B 11/00 (2006.01)
B25B 11/02 (2006.01)

(52) U.S. Cl.
CPC ............ *G09B 19/00* (2013.01); *B25B 11/002* (2013.01); *B25B 11/02* (2013.01)

(58) Field of Classification Search
CPC ........ G09B 19/00; B25B 11/002; B25B 11/02
See application file for complete search history.

(56) References Cited

U.S. PATENT DOCUMENTS

| 4,406,647 A * | 9/1983 | Foffel | B65D 27/00 493/216 |
|---|---|---|---|
| 5,156,274 A * | 10/1992 | Williams, Jr. | G09F 21/04 206/573 |
| 6,364,126 B1 * | 4/2002 | Enriquez | G09F 1/10 211/10 |
| 6,982,114 B2 * | 1/2006 | Crum | B32B 7/12 428/192 |
| 2003/0121194 A1 * | 7/2003 | Rappaport | G09F 3/20 40/711 |
| 2007/0193100 A1 * | 8/2007 | Rieiveld | G09F 19/22 40/790 |
| 2011/0296727 A1 * | 12/2011 | Savagian | B32B 7/06 40/594 |

* cited by examiner

Primary Examiner — Gary C Hoge

(57) ABSTRACT

A magnetic repair guide device comprising a first layer having a transparent upper surface, a second layer affixed below the first layer, a repair guide having visual images of the components of a consumer electronic product to be repaired and textual and/or visual instructions to repair the consumer electronic product, a space provided between the first layer and the second layer, the space being configured to removeably receive the magnetic repair guide below the transparent upper surface so that the one or more visual images and the one or more textual and/or visual instructions remain visible through the transparent upper layer and a third layer affixed below the second layer. The third layer has sufficient magnetic strength to enable the transparent upper surface to hold ferromagnetic parts of the components kept over designated places as indicated in the repair guide after being removed from the consumer electronic product.

15 Claims, 12 Drawing Sheets

CONSUMER ELECTRONICS REPAIR GUIDE CARD WITH MAGNETIC HOLDER

CROSS-REFERENCE TO RELATED APPLICATIONS

This application claims the benefit of U.S. Provisional Application No. 62/273,488, filed Dec. 31, 2015, the contents of which are incorporated herein by reference.

FIELD OF THE INVENTION

The present invention in general is related to repair guides. More specifically, the present invention is related to electronic consumer devices repair guides for having visual guidance instructions and a structured component holding surface.

BACKGROUND OF THE INVENTION

As it is happening in every domain, with the advancement of technology consumer electronic goods such as mobile phones, tablets, laptops etc. are becoming increasingly compact and sophisticated day by day. The reduced size of the devices demands that the internal components be miniaturized and tightly packed. The smaller space and more delicate components of the devices make disassembling and assembling of the devices far more difficult than the previous models/versions. For example, it is difficult for a smartphone owner or repair person to perform a repair work if the smartphone configuration does not provide easy access to various components which may require maintenance or replacement. In densely packed housings of the devices, going through the tedious process of removing one or more components using special tools and techniques in order to gain access to the component is extremely difficult. Again, once removed, the small components such as screws and fixtures must be kept arranged properly so that the parts can be easily and correctly re-assembled after the repair work has been completed. Often screws or parts are lost or misplaced if proper care is not taken during the repair process and this problem is more acute if the removed screws or components are of different sizes and if those are not interchangeable.

Thus, there is a need for a system and a method for providing easy to follow visual guidance and means to arrange the parts and components in proper order to enable convenient repair of electronic devices.

OBJECTS OF THE INVENTION

It is, therefore, an object of the present invention to provide visual guidance for repair of consumer electronics.

Another object of the present invention is to provide a system and method for keeping spares and components properly arranged on a surface for easy identification and safe keeping of the parts and components during repair.

Still another object of the present invention is to provide a system and method for avoiding annoying and time-consuming problem of losing the parts and screws from an electronic device under repair.

A further object of the present invention is to reduce the repair time of consumer electronic devices.

Yet another object of the present invention is to reduce the cost of repairing consumer electronic goods.

Still another object of the present invention is to provide a part/component holding device with replaceable repair guides for use in repair of different consumer electronic goods.

Details of the foregoing objects and of the invention, as well as additional objects, features and advantages of the invention will become apparent to those skilled in the art upon consideration of the following detailed description of the preferred embodiments exemplifying the best mode of carrying out the invention as presently perceived.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present invention is directed to a consumer electronics repair guide card with magnetic holder device, hereinafter referred to as a magnetic repair guide device, to aid in the repair and/or disassembly/reassembly of consumer electronics by using printed repair guide cards that show detailed instructions on how to repair/disassemble/reassemble small electronic devices in a detailed yet concise way using visual guides and labels, accompanied by a magnetic holder to slide a repair card into, to make the repair guide card magnetized for holding screws, parts, tools, and other objects in place on top of the labels that the repair guide describes. The magnetic repair guide device of the present invention comprises a card printed with detailed images, strategic labels and repair instructions and a magnetic holder configured to accommodate the printed repair guide. The magnetic holder further comprises a clear cover that can be used for writing with an erasable marker, a slot for the repair guide card to be inserted or removed, a magnetic base, and an anti-slip bottom layer. This magnetic repair guide device can hold screws, tools and metal parts of consumer electronic product in the place where the diagram shows using magnetization. Examples of consumer electronic products include, but are not limited to, mobile phones, tablets, digital cameras etc.

To the accomplishment of the foregoing and related ends, certain illustrative aspects of the disclosed invention are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

In order to describe the manner in which features and other aspects of the present disclosure can be obtained, a more particular description of certain subject matter will be rendered by reference to specific embodiments that are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
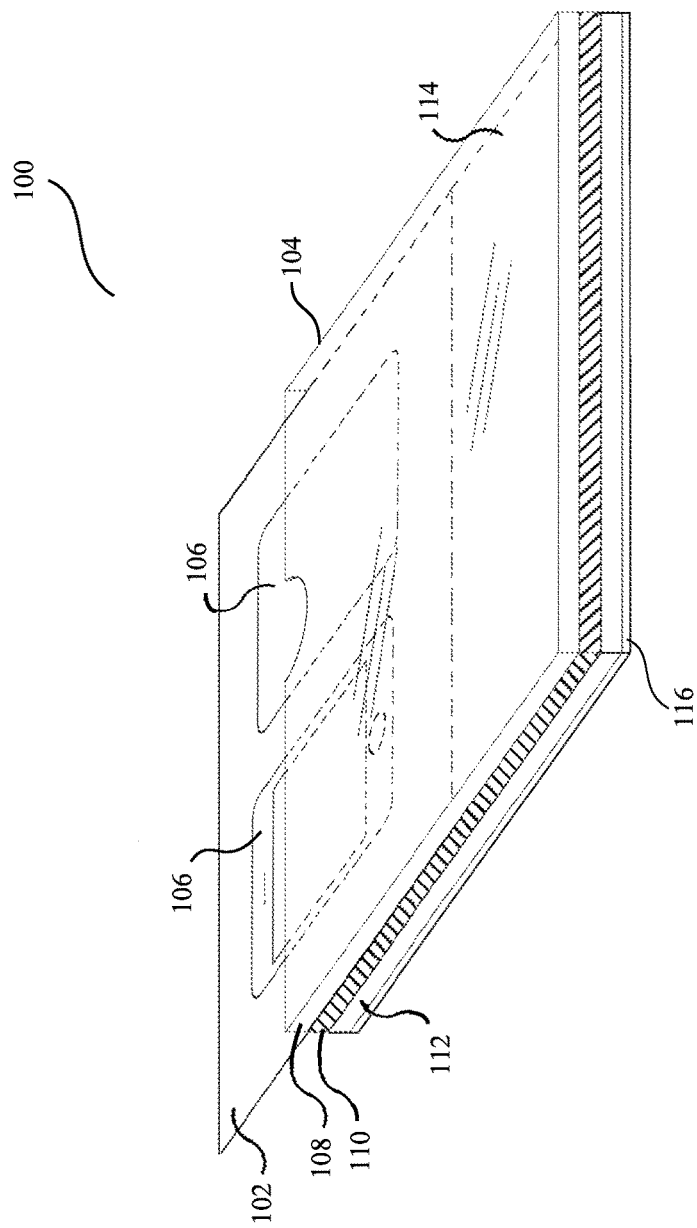
FIG. 1 is a front perspective view of the magnetic repair guide device in accordance with an embodiment of the present invention.
Figure 2:
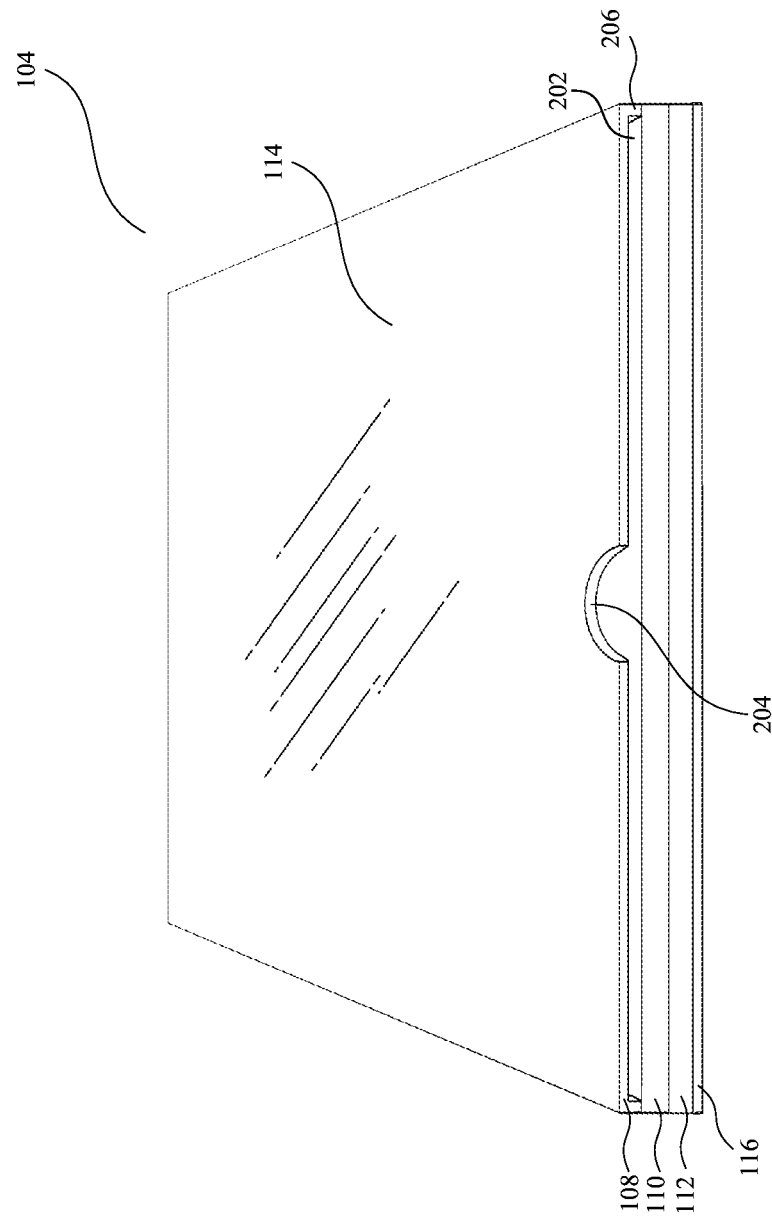
FIG. 2 is a rear perspective view of the magnetic repair guide holder in accordance with an embodiment of the present invention.
Figure 3:
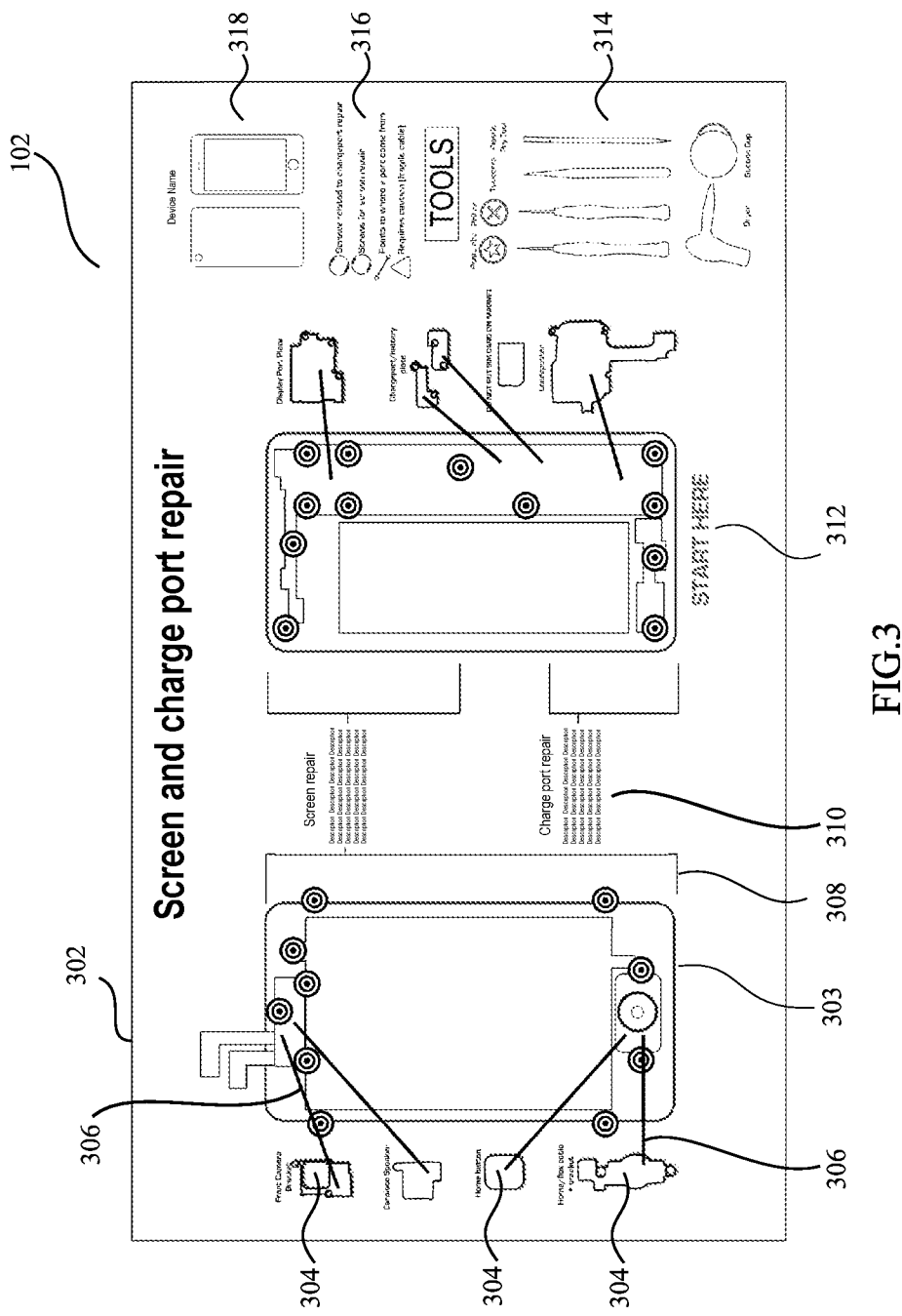
FIG. 3 is a front view illustrating a repair guide in accordance with an embodiment of the present invention.

Reference to FIG. 1, FIG. 2 and FIG. 3, the magnetic repair guide device 100 of the present invention, in one embodiment, comprises a repair guide 102 and a magnetic repair guide holder 104. The magnetic repair guide holder 104 further comprises one or more layers. For example, as shown in FIG. 1 and FIG. 2, the magnetic repair guide holder 104 comprises a first surface or first layer 108, a second surface or second layer 110, a third surface or third layer 112 and, optionally, a fourth surface or fourth layer 116.

The first layer 108 is preferably made of a clear or transparent material such as glass, plexi glass, hard plastic, or flexible thin plastic which allows full display of the contents remaining under the first layer 108. This layer can also have a coating that allows an erasable marker to write on its upper surface 114. Preferably, the coating can be an anti-scratch material made of oleophobic material or Polyethylene terephthalate or it can be a tempered glass. The second layer 110 has a projected border 206 running along the one or more edges of the second layer 110 so as to provide a space 202 between the first layer 108 and the second layer 110 when the first layer 108 and the second layer 110 are joined together by means of glue or any other known method. The space 202 allows a flat object such as the repair guide 102 of size equal to or smaller than the size of the magnetic guide holder 104 to slide under the first layer 108 in the magnetic guide holder 104. The clear/transparent first layer 108 can have a cutout 204 so that the inserted repair guide 102 or any paper or plastic card of equal or smaller size can be easily removed from the magnetic repair guide holder 104. In a preferred embodiment, the second layer 110 is made of a rigid material so that it can serve as a rigid base for the magnetic repair guide device 100.

The third layer 112 is made of a magnet or of a magnetic surface or two or more magnets are spaced affixed over the third layer 112. Overall, the magnetic strength of the third layer 112 should be strong enough to hold any ferromagnetic component kept over the transparent surface of the first layer 108. The fourth layer 116 is preferably made of an anti-slip material such as rubber, foam, rough plastic, or a sticky substance or suction-like surface. In some embodiments, a mount is disposed on top edge of the first layer 108 which can facilitate adding of accessories such as tool holder, bendable light or paper holder, for example.

Although, FIG. 3 illustrates a repair guide 102 of rectangular shape, the repair guide 102 can be of any shape or size equal to or smaller than the repair guide holder 104. In one embodiment, the repair guide 102 comprises a substrate 302, one or more printed images of components of a consumer electronic product (e.g. a mobile phone as shown in FIG. 3 for repair of screen and charge port) to be repaired/serviced with or without having name of the components and one or more textual and/or visual instructions to repair/dismantle/assemble the consumer electronic product. In a preferred embodiment, the one or more printed images of the components are of size and shape equivalent to the actual size and shape of the components. The images of the one or more parts/components and the associated instructions can be printed in any desired order/sequence/arrangement on the substrate 302. FIG. 3 shows the parts/components 304 lined up vertically along the side of the main part 303 of the consumer electronic product being repaired. A line 306 is shown connecting the part 304 to its location on the main part 303 to indicate where it came from. A bracket 308 can be shown to indicate the screws/parts that need to be repaired/disassembled/reassembled. A description of the steps 310 mentions step by step one or more instructions to aid or assist in the repair/disassembly/reassembly process of the consumer electronic product. For example, a "start here" label 312 or similar labels such as "begin here", "first step", "step one", "start", "begin" indicate where the repair/disassembly should begin when the device is being opened from a completely assembled state. A rear and front picture 318 of the consumer electronic product with the name of the consumer electronic product device is shown located in one corner of the repair guide 102 so that the consumer electronic product can be easily identified. An area 316 located on the repair guide 102 shows what each symbol on the repair guide represents. Another area 314 located on the repair guide 102 shows the tools needed for the current repair/disassembly/reassembly along with the names of the tools and images of the tools.

Figure 4:
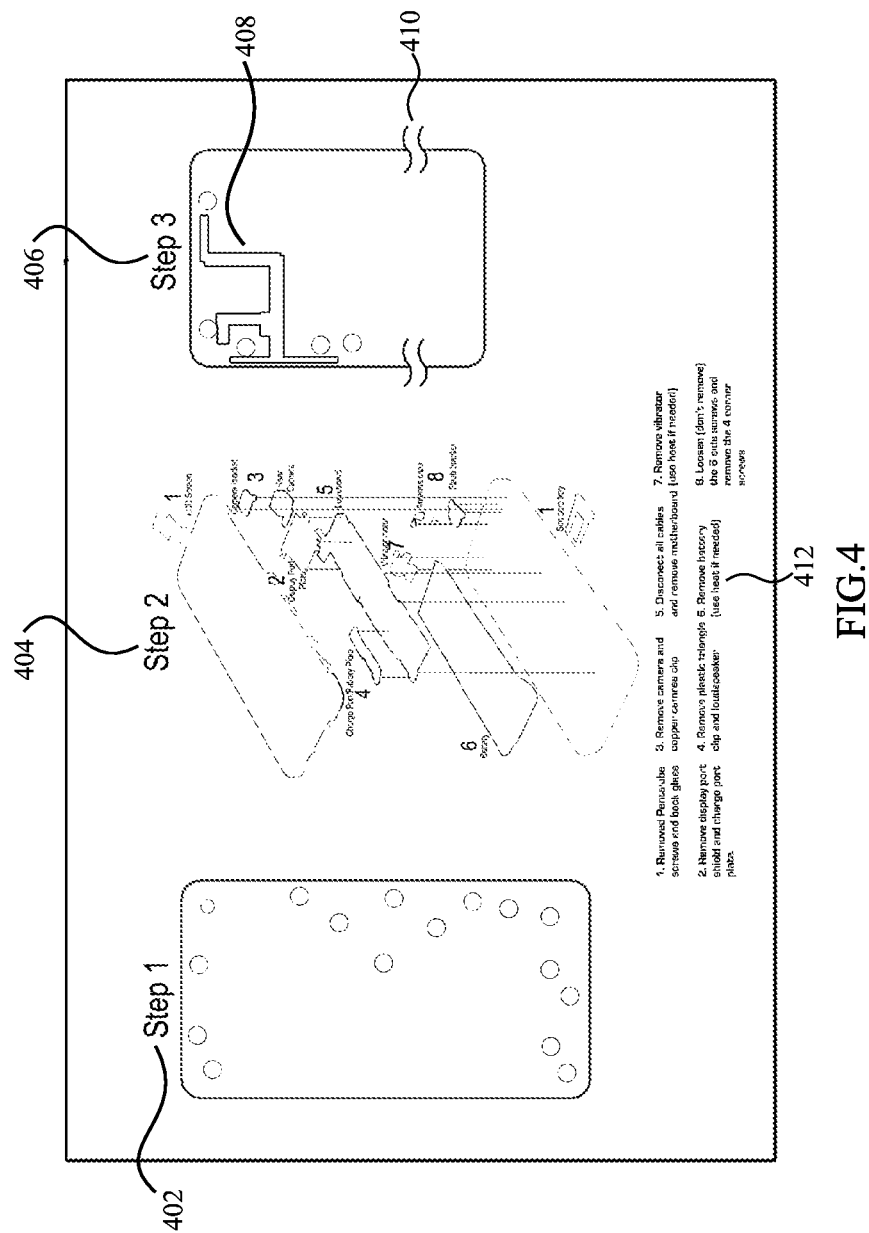
FIG. 4 is a rear view illustrating a repair guide in accordance with an embodiment of the present invention.

The repair guide 102 can also provide the instructions for the repair/disassembly/assembly of the consumer electronic product in a step-by-step visual presentation. For example, FIG. 4 illustrates the back view of the repair guide 102 that shows the repair/disassembly/reassembly of a consumer electronic product using a three step visual format. The first step 402 is the image of the consumer electronic product and its first layer. The second step 404 shows an exploded view for the layers of the consumer electronic product. The exploded view under step 404 can go vertically or horizontally on the repair guide 102. The third step 406 shows the consumer electronic product with all the necessary parts removed in order to focus on one or more parts 408 of the consumer electronic product that were not accessible before removing the previous layers of parts. The unimportant areas of the consumer electronic product are hidden or cut off (as shown by 410) from the image either by not showing the unimportant areas, or cropping off the unimportant areas by zooming into the main area of focus.

As per the type/model of the consumer electronic product to be worked on, a user can insert the appropriate repair guide 102 into the magnetic repair guide holder 104. The user may then follow the one or more instructions provided by the repair guide 102 to disassemble the consumer electronic product and place the removed parts on the designated spaces of the repair guide 102 over the upper surface 114 on the first layer 108 which is transparent or clear and which makes the one or more images and instructions printed on the repair guide 102 visible through the upper surface 114. The magnetic second layer 110 facilitates holding of the ferromagnetic metallic parts of the consumer electronic product such as screws, fixtures etc. so placed on the designated spaces by means of magnetism. Similarly, one or more metallic tools can also be placed over the upper surface 114 of the magnetic repair guide device 100 as per the positions indicated by the repair guide 102. The magnetic attraction enables the magnetic repair guide device to securely hold the different parts of the consumer electronic product being disassembled on the designated spaces which minimizes probability of losing/misplacing the parts and it also facilitates reassembling of the parts quickly in an organized manner. The third layer 112 allows the magnetic repair guide device 100 to be slip resistant when inserting or removing the repair guide 102 or while placing or removing the parts or tools on the surface of the magnetic repair guide device 100.

Figure 5:
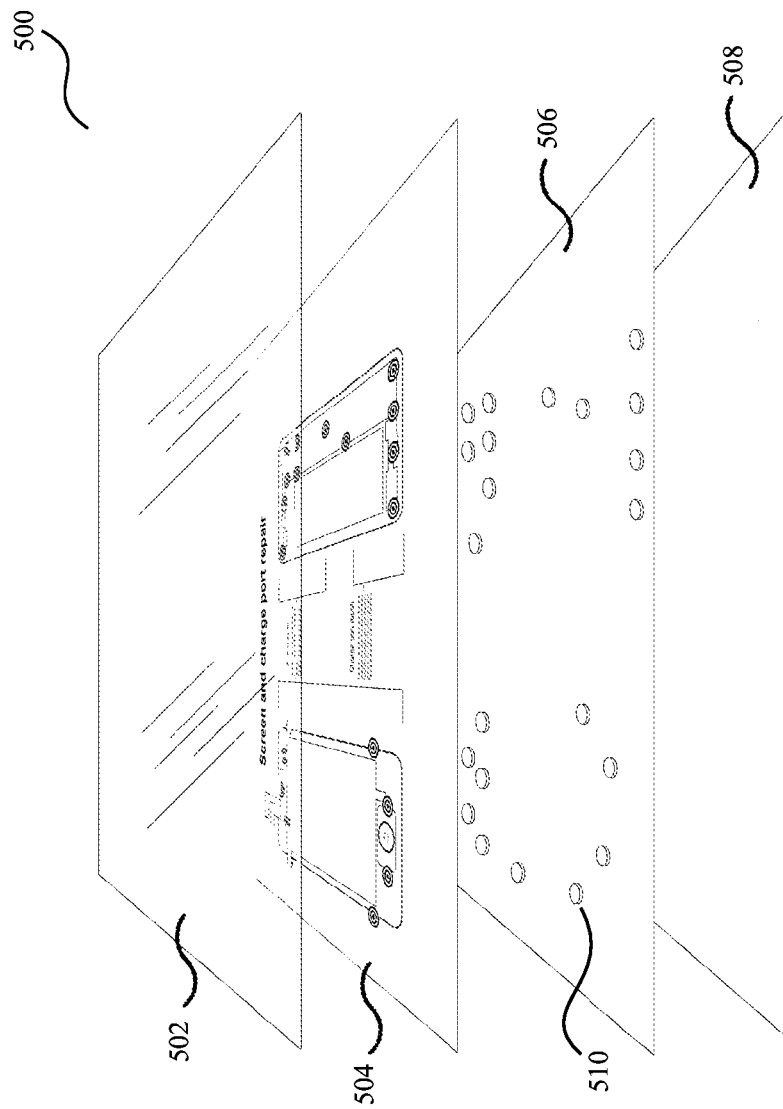
FIG. 5 is an exploded view of a repair guide device in accordance with another embodiment of the present invention.

FIG. 5 shows a repair guide device 500 in accordance with another embodiment of the present invention. In this embodiment, the repair guide device 500 comprises a first layer 502, a repair guide 504, a magnetic layer 506 and a bottom layer 508.

Reference to FIG. 5, the first layer 502 is the clear layer that covers the printed images included in the repair guide 504. This clear cover can be lamination, clear glossy coating or a plastic cover. The first layer 502 can also have a coating or made of a special layer for use with erasable markers. The second layer 504 i.e. the repair guide card is a repair guide similar to repair guide 102 of the embodiment 100. The repair guide 504 can be printed on the back and front. The shape of the repair guide can be square, rectangular, with squared or rounded corners. The third magnetic layer 506 includes one or more magnets 510. The size, shape and arrangement of the magnets 510 are configured to match the one or more symbols included in the repair guide 504. The strategic positioning of the one or more magnets 510 aligned with the graphical representation of the symbols or images of the parts ensures that the visibility of the symbols or images of the parts printed on the repair guide do not get distorted or hindered and, at the same time, the magnets 510 enables securing of screws and parts to the repair guide 500. The magnetic layer 506 can be placed either over or under the repair guide 504 while joining the layers together by means of any known method. The fourth layer 508 is made of an anti-slip material such as rubber, foam, rough plastic, or a sticky substance or suction-like surface or it could be a secondary magnetic layer.

Figure 6:
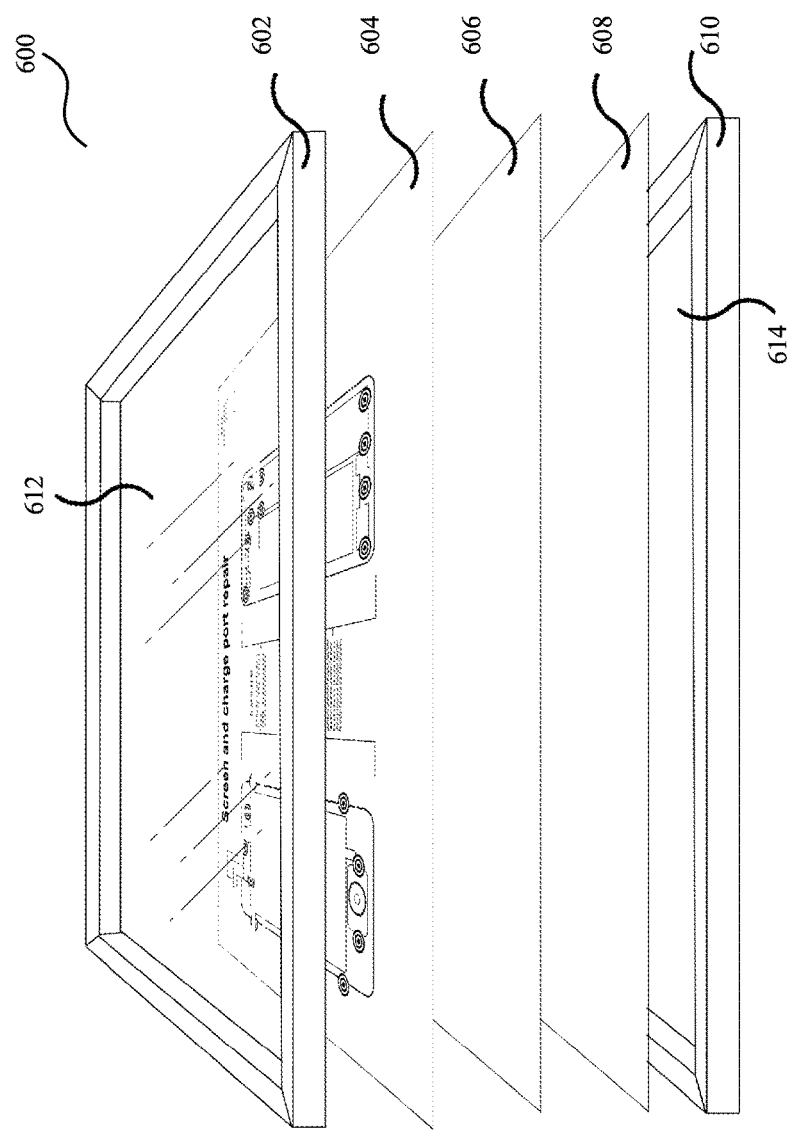
FIG. 6 is an exploded view of a repair guide device in accordance with yet another embodiment of the present invention.

FIG. 6 shows another embodiment 600 of the magnetic repair guide device in an exploded view that has an integrated magnetic layer placed between the back layer and front layer of the repair guide with anti-slip borders attached to the back and front edges of the repair guide and clear layers placed between the repair guide and the border. The magnetic repair guide device 600 comprises one or more layers. The first layer 602 is a border around the edge of the repair guide 604 configured to make the magnetic repair guide device 600 into a tray shape. This border layer is attached to the top of the clear first layer 602 or directly on top of the repair guide 604. The shape of the border 602 may correspond to the shape of the repair guide 604, which can be square, rectangular or of any other regular or irregular shape with or without squared or rounded corners. This border 602 can be made of rubber, foam, a sponge or any other similar material. The border 602 acts as a non-slip surface when the magnetic repair guide device 600 is turned upside down, and as a side barrier for any loose screws or parts when kept upright. A first clear layer 612 can be provided along with this border layer 602 to cover the repair guide 604 and protect it from scratches and wear. The second layer (i.e. repair guide) 604 and the fourth layer 608 are the two sides of the repair guide 102 of embodiment 100 which are provided separately on either side of the third layer. The third layer 606 contains the magnetic layer that is used for securing screws and small parts to the repair guides 604 and 608. This magnetic layer is attached to a layer or it sits inside a layer that is attached to the bottom/top of the repair guides 604 and 608. The fifth layer 610 is a border around the edge of the reverse side of the repair guide 608. Similar to the shape, size and function of border 602, border 610 makes the magnetic repair guide device act like a tray on the opposite side. Also, similar to the first clear layer 612, a second clear layer 614 may be provided inside the border 610.

Figure 7:
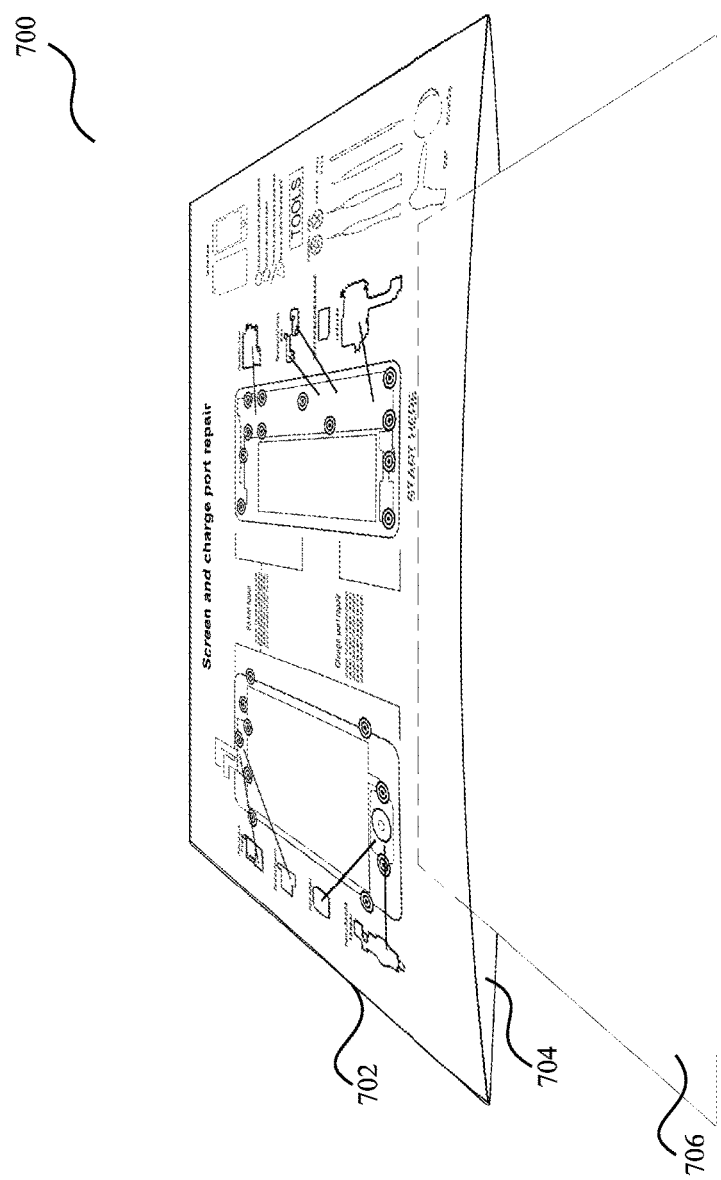
FIG. 7 is an envelope type repair guide device in accordance with still another embodiment of the present invention.

FIG. 7 is fourth embodiment 700 of a repair guide device of the present invention wherein the repair guide is configured as an envelope provided with an open end to receive a magnetic layer inside. In this embodiment, the same magnetic layer 706 can be for insertion between the first layer 702 and the second layer 706 of different repair guides.

Figure 8:
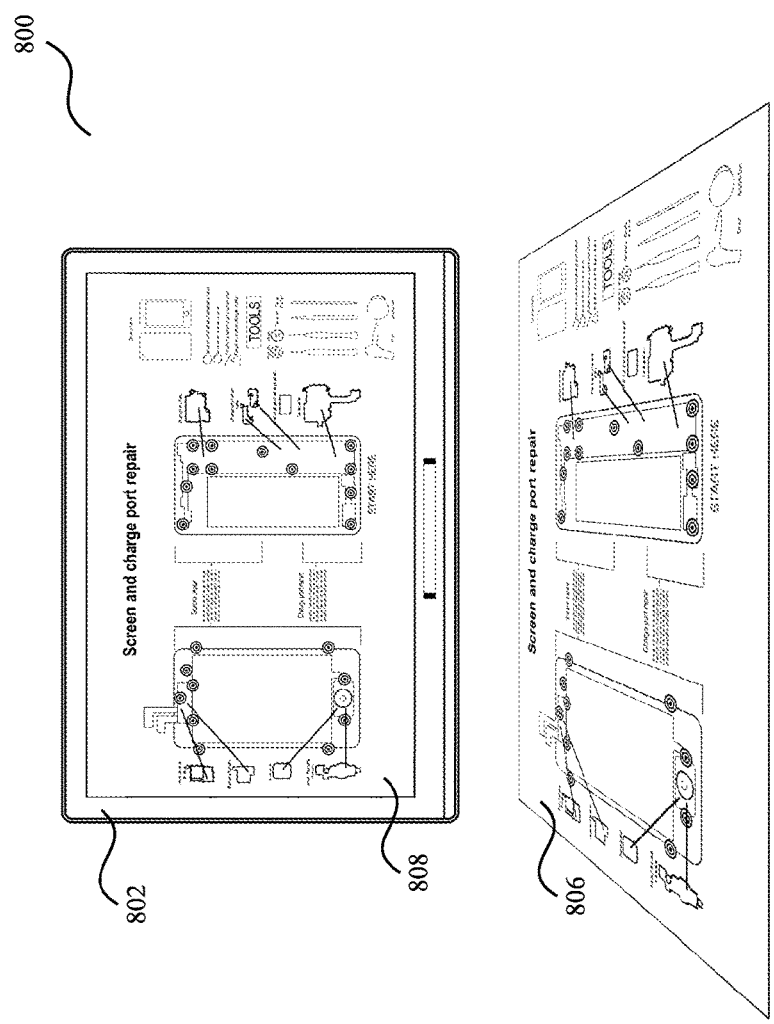
FIG. 8 is a view of the repair guide card and an accompanying video displayed on a TV or monitor in accordance with an embodiment of the present invention.

FIG. 8 is another embodiment 800 of the present invention wherein a video 808 of the contents of a repair guide 806 are also shown on a video display device 802 such as TV or computer monitor. The video 808 would correspond to each part of the repair guide 806 by using the same images and labels to further aid in the repair of consumer electronic products. The repair guide on the video 808 resembles the look, structure, format, and layout of the repair guide 806.

Figure 9:
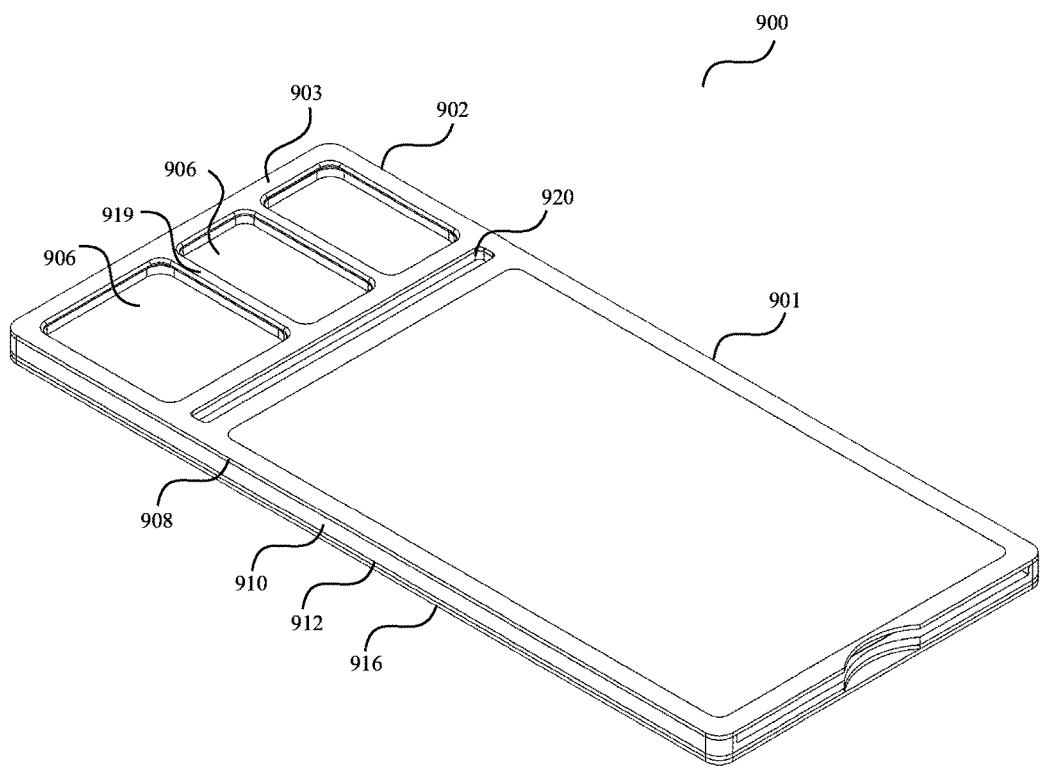
FIG. 9 is a front perspective view of another embodiment of magnetic repair guide holder having one or more side pockets.
Figure 10:
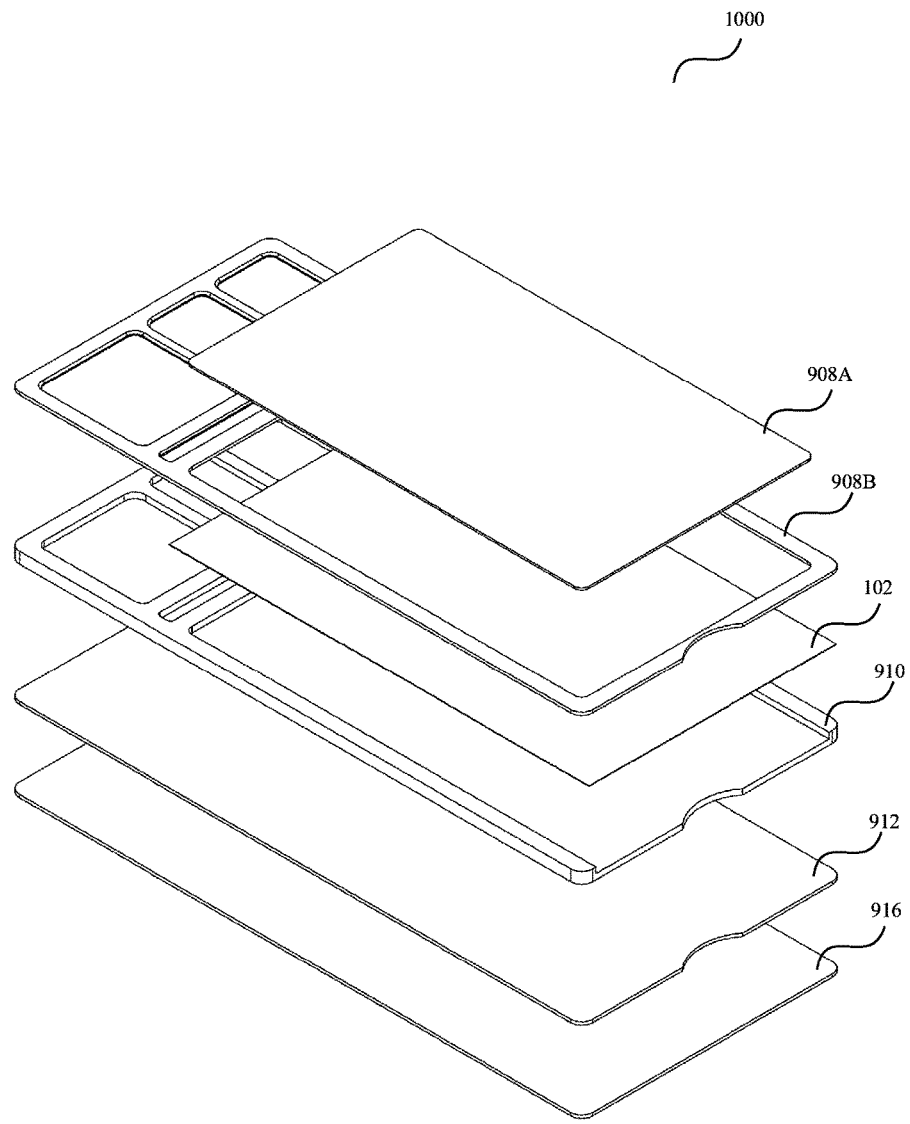
FIG. 10 is an exploded view of the repair guide holder of FIG. 9 with a repair guide card.

Reference to FIG. 9 and FIG. 10, in another embodiment, one or more cavities or pockets 906 adapted to receive one or more components such as battery, camera, mother board etc. are disposed on the magnetic repair guide holder 900 of the present invention. Except the cavities the first layer 908 of embodiment 900 is similar to first layer 108 of embodiment 104 structurally and functionally. In the same way, second layer 910 of embodiment 900 is similar to second layer 110 of embodiment 104 and so do third layer 912 to 112 and fourth layer 916 to 116. When a soft material like foam is used to make the first and second layers of the magnetic repair guide holder, a layer of hard material may optionally be added just above the fourth layer to make the magnetic repair guide holder stiff. The top part 902 of the magnetic repair guide holder 900 extends from the bottom part 901 to provide the one or more pockets 906. Reference to FIG. 10, the first layer 908 may further comprise a transparent upper surface 908A and a frame structure 908B. The border of the frame structure 908B remains little raised above the transparent upper surface 908A to give the magnetic repair guide device a tray like structure. The ribs 919 of the extended portions of frame 908B of the first layer 908 and the second layer 910 form the one or more pockets 906 of uniform or variable sizes partitioned from each other. Additionally, a cavity 920 configured to receive a standard-sized erasable marker tool may be disposed on the top part 902.

Figure 11A:
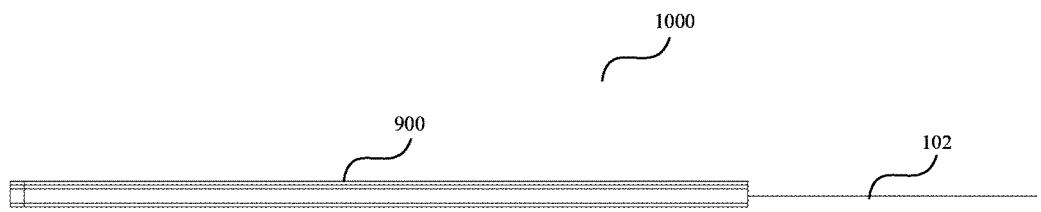
FIG. 11A is a side view of the repair guide holder of FIG. 9 with a repair guide card.
Figure 11B:
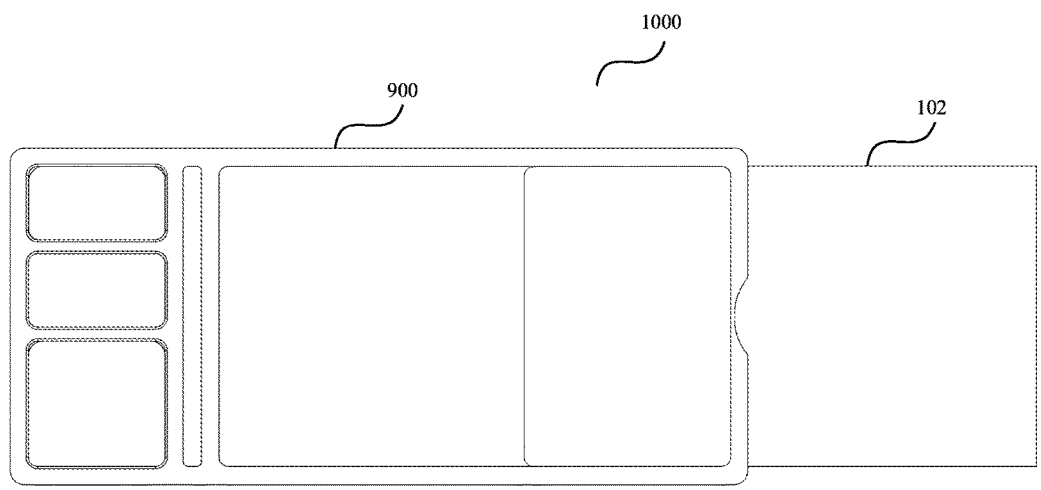
FIG. 11B is a top view of the repair guide holder of FIG. 9 with a repair guide card.
Figure 12:
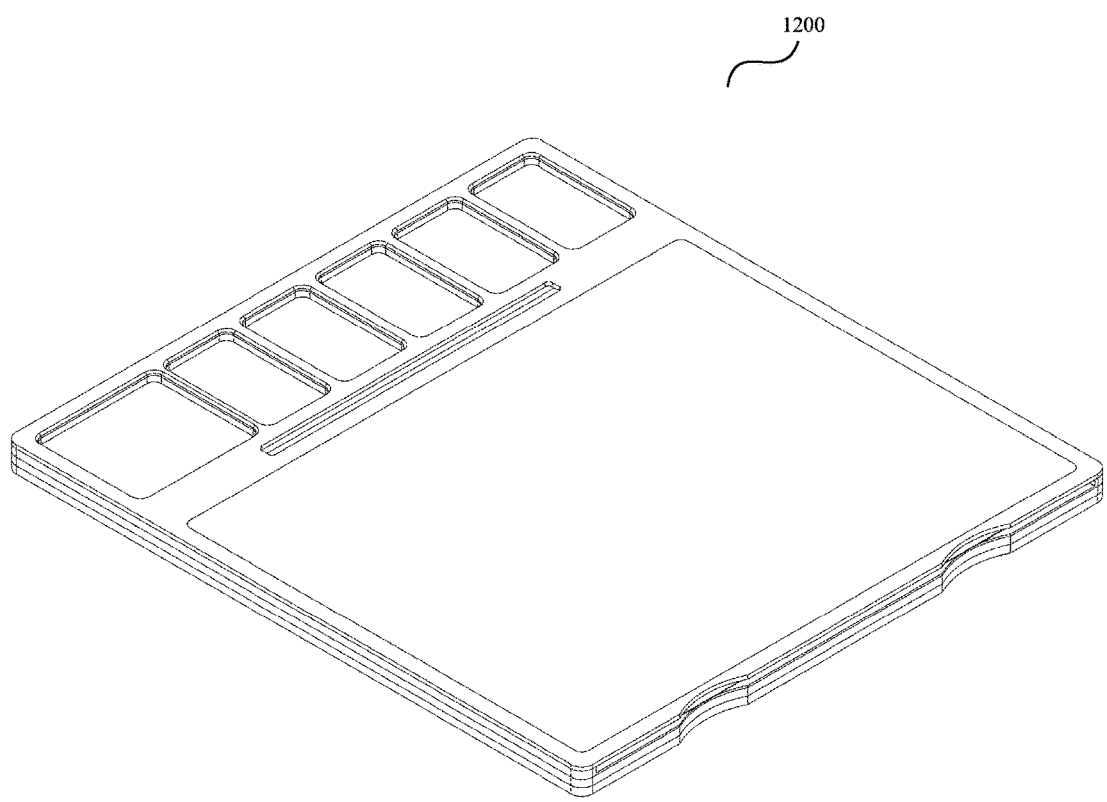
FIG. 12 is a front perspective view of a bigger version of the magnetic repair guide holder of FIG. 9.

FIG. 10 illustrates an exploded view of the magnetic repair guide device 1000 whereas FIG. 11A illustrates a side view and FIG. 11B illustrates a top view. In another embodiment, as shown in FIG. 12, the magnetic repair guide device 1200 of FIG. 12 is a bigger version of the magnetic repair guide device of FIG. 9 which can hold more than one repair guides or a single large-sized repair guide.

The use of the terms "a" and "an" and "the" and similar referents in the context of describing the invention are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "affixed", "fitted" are to be construed as partly or wholly contained within, attached to, or joined together, even if there is something intervening. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Moreover, any combination of the above-described elements in all possible variations thereof is encompassed by the invention unless otherwise indicated herein or otherwise clearly contradicted by context. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. A magnetic repair guide device comprising:
    a first layer, said first layer having a transparent upper surface;
    a second layer affixed below said first layer;
    a repair guide, said repair guide having one or more visual images of one or more components of a consumer electronic product;
    a space provided between said first layer and said second layer, said space being configured to removeably receive said repair guide below said transparent upper surface so that said one or more visual images remain visible through said transparent upper layer; and
    a third layer affixed below said second layer, said third layer comprising one or more magnets configured to match location of said one or more visual images of said one or more components of said consumer electronic product.

2. The magnetic repair guide device as in claim 1, wherein said magnetic repair guide further comprises a fourth layer affixed below said third layer to provide an anti-slip surface.

3. The magnetic repair guide device as in claim 1, wherein said magnetic repair guide further comprises a layer of hard material to make said magnetic repair guide device stiff.

4. The magnetic repair guide device as in claim 1, wherein said transparent upper surface comprises a coating capable of accepting erasable markings thereon.

5. The magnetic repair guide device as in claim 1, wherein one or more pockets capable of receiving said one or more components are disposed at one side of said magnetic repair guide.

6. A magnetic repair guide device comprising:
    a first layer, said first layer having a transparent upper surface;
    a second layer affixed below said first layer;
    a repair guide, said repair guide having one or more visual images of one or more components of a consumer electronic product;
    a space provided between said first layer and said second layer, said space being configured to removeably receive said repair guide below said transparent upper surface so that said one or more visual images remain visible through said transparent upper layer; and
    a third layer having magnetic strength affixed below said second layer;
    wherein a cavity configured to receive a standard-sized erasable marker tool is disposed on a top part of said first layer.

7. The magnetic repair guide device as in claim 6, wherein said magnetic repair guide further comprises a fourth layer affixed below said third layer to provide an anti-slip surface.

8. The magnetic repair guide device as in claim 6, wherein said magnetic repair guide further comprises a layer of hard material to make said magnetic repair guide device stiff.

9. The magnetic repair guide device as in claim 6, wherein said transparent upper surface comprises a coating capable of accepting erasable markings thereon.

10. The magnetic repair guide device as in claim 6, wherein one or more pockets capable of receiving said one or more components are disposed at one side of said magnetic repair guide.

11. A magnetic repair guide device comprising:
    a first layer, said first layer having a transparent upper surface;
    a second layer affixed below said first layer;

a repair guide, said repair guide having one or more visual images of one or more components of a consumer electronic product;

a space provided between said first layer and said second layer, said space being configured to removeably receive said repair guide below said transparent upper surface so that said one or more visual images remain visible through said transparent upper layer; and a third layer having magnetic strength affixed below said second layer;

wherein, a border of a frame structure of said first layer remains projected above said transparent upper surface to form a tray like structure around said transparent upper surface.

12. The magnetic repair guide device as in claim 11, wherein said magnetic repair guide further comprises a fourth layer affixed below said third layer to provide an anti-slip surface.

13. The magnetic repair guide device as in claim 11, wherein said magnetic repair guide further comprises a layer of hard material to make said magnetic repair guide device stiff.

14. The magnetic repair guide device as in claim 11, wherein said transparent upper surface comprises a coating capable of accepting erasable markings thereon.

15. The magnetic repair guide device as in claim 11, wherein one or more pockets capable of receiving said one or more components are disposed at one side of said magnetic repair guide.

* * * * *